March 7, 1967  R. E. LOFTFIELD ETAL  3,308,043
METHOD OF DISCHARGING AMALGAM FOR
INCLINED PLANE MERCURY CELLS Filed Oct. 31, 1962  5 Sheets-Sheet 1

INVENTORS
RICHARD ERIC LOFTFIELD
ALEXANDER LOUIS BARBATO
HENRY WILLIAM LAUB
GEORG MESSNER
BY
ATTORNEYS

INVENTORS
RICHARD ERIC LOFTFIELD
ALEXANDER LOUIS BARBATO
HENRY WILLIAM LAUB
GEORG MESSNER

March 7, 1967

R. E. LOFTFIELD ETAL  3,308,043
METHOD OF DISCHARGING AMALGAM FOR
INCLINED PLANE MERCURY CELLS

Filed Oct. 31, 1962

INVENTORS
RICHARD ERIC LOFTFIELD
ALEXANDER LOUIS BARBATO
HENRY WILLIAM LAUB
GEORG MESSNER

BY

ATTORNEYS

March 7, 1967 R. E. LOFTFIELD ETAL 3,308,043
METHOD OF DISCHARGING AMALGAM FOR
INCLINED PLANE MERCURY CELLS
Filed Oct. 31, 1962 5 Sheets-Sheet 4

INVENTORS
RICHARD ERIC LOFTFIELD
ALEXANDER LOUIS BARBATO
HENRY WILLIAM LAUB
GEORG MESSNER
BY Hammond & Littell
ATTORNEYS INVENTORS
RICHARD ERIC LOFTFIELD
ALEXANDER LOUIS BARBATO
HENRY WILLIAM LAUB
GEORG MESSNER
BY
ATTORNEYS United States Patent Office 3,308,043
Patented Mar. 7, 1967

3,308,043
METHOD OF DISCHARGING AMALGAM FOR INCLINED PLANE MERCURY CELLS
Richard Eric Loftfield, Chardon, and Alexander Louis Barbato, Perry, Ohio, Henry William Laub, Pasadena, Tex., and Georg Messner, Milan, Italy, assignors, by direct and mesne assignments, to Oronzio de Nora Impianti Elettrochimici, Milan, Italy, a corporation of Italy
Filed Oct. 31, 1962, Ser. No. 234,309
5 Claims. (Cl. 204—124)

This invention relates to electrolytic cells for the electrolysis of alkali metal halide brines and, more particularly, relates to such electrolytic cells which have a flowing mercury film cathode.

The production of caustic soda and chlorine by the electrolysis of brine is, for the most part, carried out in either a diaphragm cell or in a flowing mercury film cathode cell. Although in the past, particularly in the United States, producers of caustic soda and chlorine have utilized diaphragm cells to a much greater extent than mercury cells, in recent years many of the new installations for the electrolysis of brine have been mercury cell installations. As a result, considerable effort has been expended in research activities in an attempt to modify existing mercury cells so as to overcome some of the disadvantages which heretofore have been inherent in these cells.

Although it is known that mercury cells can, in general, tolerate a higher content of certain impurities in the alkali metal halide brine feed for the cells than can the diaphragm cells, particularly sulfate impurities and metal impurities such as calcium, the impurity tolerance of a mercury cell is still not sufficiently high to eliminate the need for purifying the brine feed. Thus, when the alkalide metal halide brine for the presently used commercial horizontal mercury cell contains greater than about 100 p.p.m. calcium ions, 5.0 p.p.m. magnesium ions, 10.0 g./liter sulfate ions and 1 p.p.m. iron, excessive amounts of the so-called "mercury butter" are formed. This "mercury butter," in the amalgam, results in the release of comparatively large amounts of hydrogen, thus creating a potential explosion hazard in the operation of the cell. Inasmuch as the raw brine used in the mercury cells contains considerably greater than the maximum impurities which can be tolerated, it is apparent that treatment of the brine to remove at least a portion of these impurities is necessary before the brine can be introduced into the cell.

In addition to attempting to overcome the above difficulties, prior workers in the art have expended considerable time and effort in attempts to modify the existing mercury cells to increase the current efficiency obtained in the cell and to attain a higher current density without a corresponding increase in cell voltage.

One manner by which these difficulties have been sought to be overcome is by the use of the so-called "slot type" or "high velocity-type" mercury cells such as illustrated in United States Patent No. 2,898,284. In cells of this type, the mercury cathode, as a thin layer or film of mercury, is forced through the cell at a high velocity while the alkali metal halide brine is, likewise, injected into the cell at a high velocity. In this manner, the brine sweeps the mercury film along the cathode base plate and, also, sweeps the under surface of the anode substantially clean of chlorine bubbles, so that there is little polarization of the anode and the cell can be run at high current densities with a low voltage drop across the cell. Additionally, such cells are alleged to have a high tolerance to impurities in the brine, thus reducing, to a considerable extent, the amount of brine purification required.

Although cells of this type do overcome some of the disadvantages which heretofore have been inherent in mercury cells, they introduce additional disadvantages. These disadvantages are in the complexity of the cell itself, brought about by the various appurtenances to the cell required to introduce the brine and/or mercury at a high velocity and to confine the brine and mercury flow to a narrow electrolyte gap between the anodes and the flowing mercury cathode. Not only are such cells considerably more expensive than the more commonly used mercury cells, but, additionally, the operation of such cells is also complex. Accordingly, cells of this type have not been widely adopted, even though they do overcome some of the prior disadvantages of mercury cells; those skilled in this art apparently feel that the disadvantages of these cells in terms of added cost and more complex operation greatly outweigh the advantages.

Other workers in the art have tried to overcome the difficulties encountered in the operation of mercury cells by using a so-called "vertical" mercury cell. Such cells have the additional advantage in that, by being vertical, they take up considerably less floor space than do the traditional horizontal mercury cells. Inasmuch as it is possible, when using such cells, to install a greater number of cells in any given area, the utilization of a square foot or square yard of floor space, in terms of the total amounts of caustic soda and chlorine produced, is greatly increased over that when using a horizontal type cell.

In these cells, the mercury film flows down a substantially vertical wall. However, it is generally necessary to incorporate a diaphragm between the flowing mercury film and the anode so as to maintain a separation of the products of the cell. In so doing, the disadvantages of diaphragm cells are introduced into the mercury cell without any of the corresponding advantages.

Accordingly, the vertical mercury cells and the so-called "slot-type" or "high velocity-type" horizontal mercury cells, have not been generally accepted by the industry.

It is, therefore, an object of the present invention to provide an electrolytic cell of the flowing-film mercury type, which cell is characterized by a high tolerance to impurities in the brine used in the cell, particularly, calcium, magnesium, iron, vanadium, titanium and sulfate impurities.

Another object of the present invention is to provide a flowing-film mercury cathode electrolytic cell which operates at high current densities and comparatively low voltages while still maintaining a high current efficiency.

Another object of the present invention is to provide an inclined plane mercury cell, operating at an inclination of about 2° to about 85°, preferably about 5° to about 30° from the horizontal, and to provide a method and means for discharging mercury from said cell which will absorb the kinetic energy of the mercury flowing down the greater incline of the cell without splashing of the mercury and without entrainment of impurities and brine in the mercury discharged from said cell.

Another object of this invention is to provide an inclined plane mercury cell, operating at an inclination of about 2° to about 85°, preferably about 5° to about 30° from the horizontal, which will be self-discharging as to those impurities which ordinarily accumulate on the amalgam surface of a horizontal mercury cell and cause inefficiency in the cell operation.

A further object of the present invention is to provide a flowing-film mercury cathode cell, which cell is readily adapted for incorporation into a "bi-polar" or series cell.

Another object of the present invention is to provide a flowing-film mercury cathode cell, which can produce amalgams of a higher concentratiton than are generally feasible with present cells, and which requires a much lower mercury inventory than do present cells.

These and other objects will become apparent to those skilled in the art from the description of the invention which follows.

Electrolysis cells of the type herein described may be used for various purposes, such as the electrolysis of alkali metal salts and other materials. In the following description, the construction and operation of our improved cell in the electrolysis of sodium chloride to produce chlorine and caustic soda will be described as one embodiment of our invention. It will be understood, however, that this is only for the purpose of illustration and that the same apparatus and process may be used for the electrolysis of lithium, potassium, cesium and rubidium chlorides, for the electrolysis of barium and strontium chlorides, and for the electrolysis of other salts which undergo decomposition under the electrolysis conditions which are produced in a flowing mercury cathode electrolysis cell and for other purposes.

In the accompanying drawings which illustrate preferred embodiments of our invention, FIG. 1 is a side elevation in section of one embodiment of the electrolytic cell of the present invention;

Figure 1:
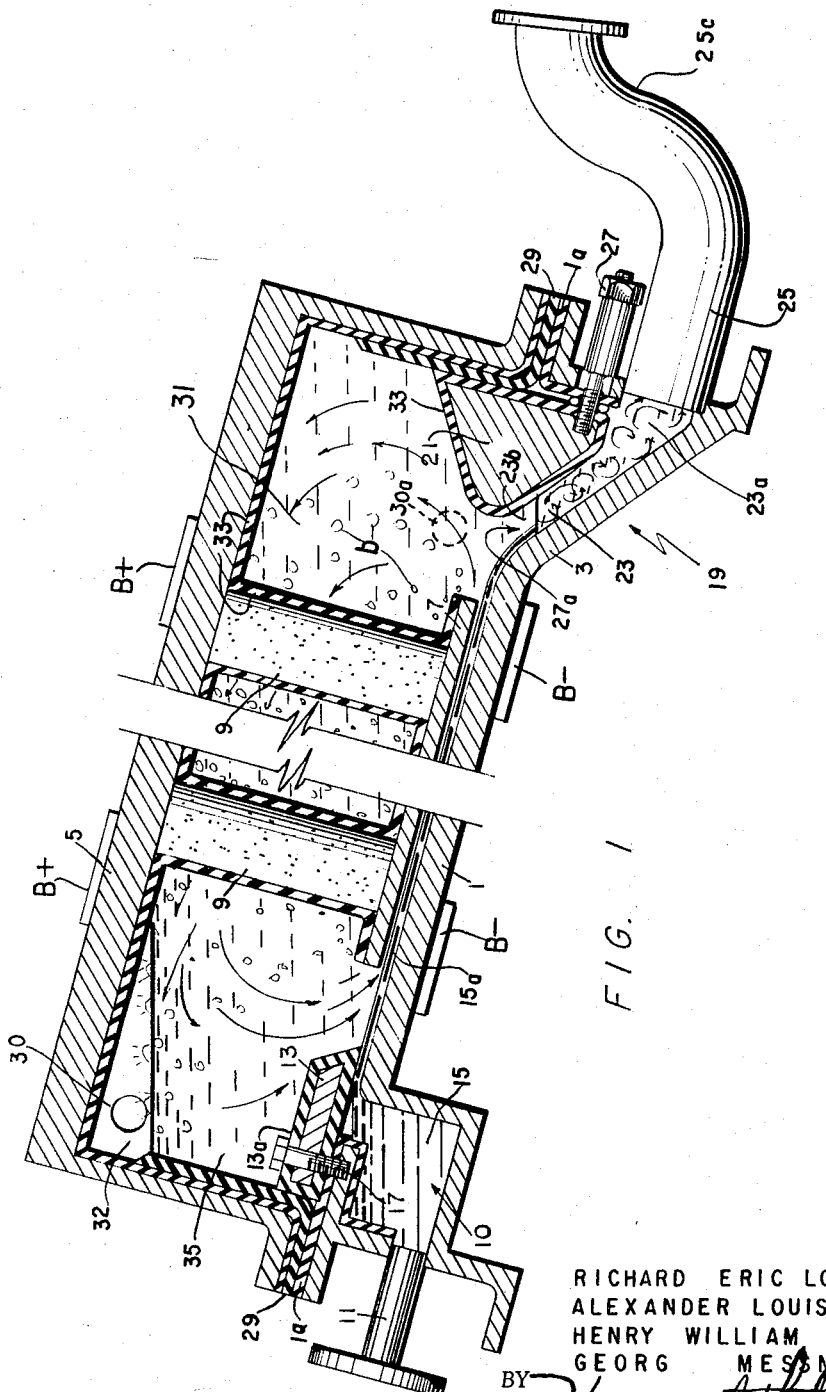

The several embodiments of the outlet means hereinafter described function to retain the brine in the cell and prevent its entrainment in the amalgam discharge stream while providing for free gravity discharge of amalgam from the cell. These discharge means maintain a cathodic charge on all the amalgam and prevent oxidation of the sodium and mercury. They also prevent stagnation of the amalgam surface in the discharge box, and thereby prevent chemical or electrochemical reactions which reduce the cell efficiency. They also, in co-operation with the brine circulation within and through the cells, facilitate the automatic removal of foreign particles from the cell in the brine discharge stream, and they also function to reduce the mercury inventory of the cell.

In the present commercial horizontal mercury cells, which operate at an inclination of less than 0.5° (usually less than 0.25°) from the horizontal, the amalgam flows under a dam which holds back the upper surface of the slowly flowing mercury amalgam and allows subsurface amalgam flow under the dam. This has the effect of skimming the top of the amalgam surface and retaining the impurities therein in a stagnant layer behind the dam where they are in contact with the electrolyte. This allows solid particles, such as graphite from the anodes, to settle on the stagnant surface, and also allows the accumulation of electrochemical deposits of metals, such as magnesium, calcium and other impurities from the brine, which promote the evolution of hydrogen within the cell. Since these particles lie on the surface of the mercury and are not automatically purged from the normal horizontal mercury cell, the operation of these cells must be constantly monitored so that these foreign materials can be manually purged or flushed from the cell. This adds to the expense of operation, required additional labor and results in loss of brine, chlorine and mercury.

The present mercury cell end boxes also retain a large amount of mercury therein which adds to the mercury inventory of the plant. These difficulties are increased when the inclination of the horizontal mercury cell is increased from its normal inclination of less than 0.5° (usually less than 0.25° from the horizontal) to the inclination at which our cell operates, namely from 2° to about 85°, preferably about 5° to about 30° from the horizontal. However, our invention overcomes all these difficulties.

When a flowing mercury cathode electrolysis cell is inclined from the horizontal at angles of about 2° to about 85°, preferably about 5° to about 30°, the amalgam approaching the discharge end of the cell acquires an extremely high kinetic energy, part of which must be dissipated or absorbed without causing short circuiting to the anode and without splattering, which would result in the loss of cathodic protection of the splattered drops and oxidation of the sodium and mercury. The brine and amalgam turbulence is also much greater causing a greater tendency for the brine to be entrained in and discharged with the amalgam, which would cause contamination of the caustic produced from the amalgam.

The new cell construction and amalgam discharge means, which is the subject of our invention, meets all the conditions encountered in operating a flowing mercury cathode electrolysis cell at inclinations of 2° to 85° from the horizontal and functions automatically and efficiently, thereby improving the continuity and efficiency of the cell operation. It produces a high turbulence of both the brine and the amalgam and will prevent any solid particles, such as graphite (apparent specific gravity 1.6 to 2.2) from settling on the mercury surface and causing hydrogen evolution. It will allow any calcium or magnesium (specific gravity 1.55 and 1.74) which has been electrodeposited from the brine and floats on the amalgam (specific gravity 13.5) to come in contact with the acid brine and redissolve. The agitation of the brine and the amalgam will also permit foreign materials to be picked up from the surface of the amalgam and suspended in the brine and automatically discharged with the depleted brine. Hence the need for periodic manual brine purge necessary in the operation of normal mercury cells is eliminated.

While the agitation is sufficient to accomplish all the above functions, our discharge means and method will prevent entrainment of brine (specific gravity 1.2) in the amalgam, which would contaminate the caustic soda produced from the amalgam. In spite of high amalgam turbulence or churning, splashing is prevented and there is no loss of cathodic protection on the amalgam which would result in oxidation of splashed mercury droplets and loss of cell efficiency.

Figure 11:
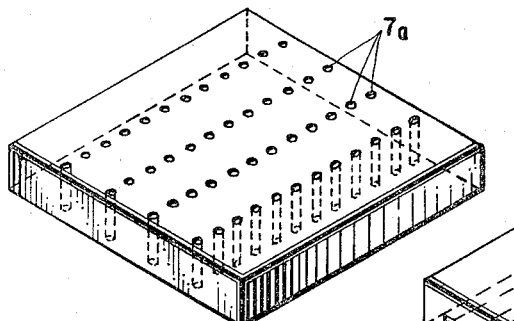
FIGS. 11 through 17 are isometric views of various anode configurations for use in the present electrolytic cell, with some of the obvious hidden lines being omitted for the sake of clarity.
Figure 12:
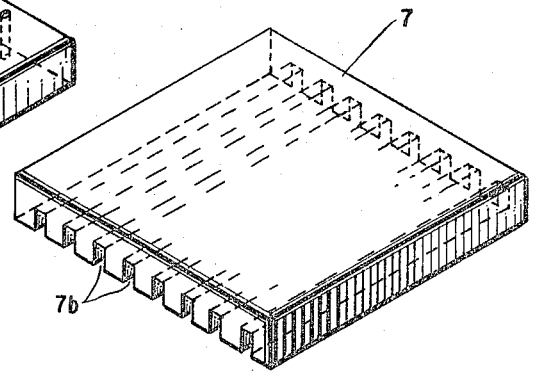
Figure 13:
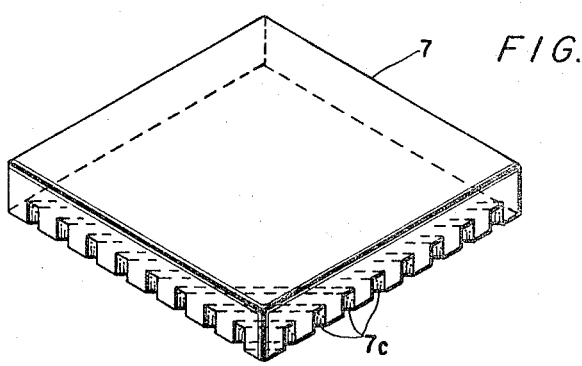

Referring now to the drawings, FIG. 1 is a side elevation in section of one embodiment of the mercury cathode electrolytic cell of the present invention. In this figure, the cathode base plate 1 of the cell is shown as being inclined below the horizontal about 15°. The inclination can, however, be from about 2° to about 85°, with best performance being realized in cells inclined from about 5° to about 30° from the horizontal. A cover member 5 for the cell is provided with flanges for securing it to the cathode base plate 1 in any convenient manner, as for example, by bolting (not shown). Anode members 7 are secured to and suspended from the cover member 5 by means of support members 9. The anode members 7 are spaced from the cathode base plate 1 a distance sufficient to permit passage of a film of mercury and brine between the cathode base plate and the anode surface of the anode member, without the anode member coming in contact with the mercury film. The anode support members 9 are secured to the anodes 7 and to the cover member 5 in any convenient manner which will provide an electrically conductive connection therebetween. Bus bars B+ and B— are connected to the cover member 5 and the base plate 1 respectively. As is shown in FIGS. 11 through 17 the anode members 7 may have varying configurations and be formed of various materials, such as graphite or metal. Where the anode members are graphite, they may be in the form of solid graphite blocks or, as is shown in FIGS. 11 through 13, they may be graphite blocks having gas release holes or slots therein, or a combination of slots and gas release holes. Where the anode members are graphite and slotted, these slots may be arranged so as to be parallel to the mercury flow, perpendicular to the mercury flow or diagonal to the mercury flow. Slotted graphite anodes of this type are shown most clearly in FIGS. 12 and 13.

As is shown in FIGS. 14 through 17 the anode member 7 may also be made of metal in the form of slabs or bars, rods, perforated sheet or expanded metal. Where metal is used for the anode member, it is, of course, desirable that the metal be resistant to the corrosive atmosphere within the cell. Thus, it has been found to be preferable that the support members and the anode members be at least coated with a metal such as titanium, which will resist the chlorine atmosphere in the cell and will not be electrochemically attacked. It is, however, necessary that the anode surface of these anode members has a coating of a material which has characteristics suitable for chlorine discharge. Additionally, this coating must not be readily attacked by chlorine and must be inert to electrochemical attack. Exemplary of materials suitable for this coating are platinum, graphite and magnetite.

Referring again to FIG. 1, a mercury distributing means, indicated generally as 10, is disposed at one end of the cathode base plate 1. The distributing means includes an inlet pipe 11 for introducing mercury into a reservoir 15, formed at one end of the cathode base plate 1 and extending over substantially the entire width of the cathode base plate. A spreader member 13 is secured to the top of the reservoir 15 with a plastic or non-conducting adjusting bolt 17 which acts to compress or release the compression in elastic insulation layers 1a and 13a to move the spreader member 13 toward or away from the upper edge of reservoir 15. The spreader member 13 is positioned with respect to the cathode base plate 1 so as to be spaced apart therefrom and form a slot therewith. The spreader member 13 extends over substantially the entire width of the base plate so that the slot formed likewise extends over substantially the entire width of the cathode base plate. The mercury, which is introduced through the conduit 11 into the reservoir 15, fills the reservoir and overflows therefrom through the slot formed between the spreader member 13 and cathode base plate 1. By means of the adjusting bolt 17 the distance between the spreader member 13 and the cathode base plate 1 can be varied, thus varying the thickness of the mercury film on the cathode base plate. In this manner a substantially even film of mercury is spread over substantially the entire width of the base plate.

Figure 5:
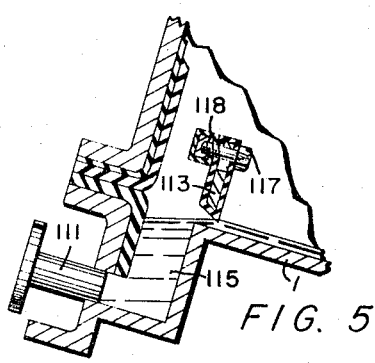
FIGS. 5 through 7 are side elevations in section of various forms of mercury distributing means for use with the present electrolytic cell.
Figure 6:
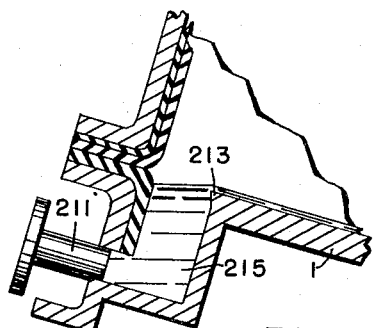
Figure 7:
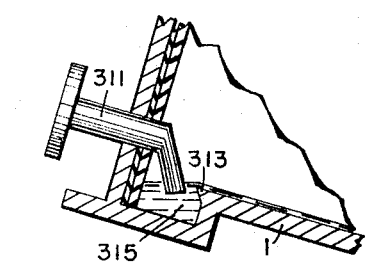

Other forms of mercury distributors may be used and several alternative forms are shown in FIGS. 5 through 7. As is shown in FIG. 5, the mercury is introduced through the conduit 111 into the reservoir 115 from which it overflows onto the cathode base plate 1. The thickness of the mercury film on the cathode base plate is controlled by the spreader member 113, which is adjustably secured to the cross bar 118 by means of a bolt 117. In FIG. 6, the spreader member, for flowing a substantially even film of mercury over substantially the entire width of the cathode base plate, is formed as a knife edge 213 on the end of the cathode base plate. The mercury introduced through the conduit 211 into the reservoir 215 overflows therefrom over the knife edge 213, which forms the mercury as a film on the base plate 1. FIG. 7 shows a similar arrangement as in FIG. 6, with the exception that the conduit 311, for introducing the mercury into the reservoir 315, enters the reservoir above the surface of the mercury in the reservoir. In this configuration, as in FIG. 6, the means for spreading the film of mercury on the cathode base plate 1 is a knife edge 313 formed at the end of the cathode base plate.

Figure 2:
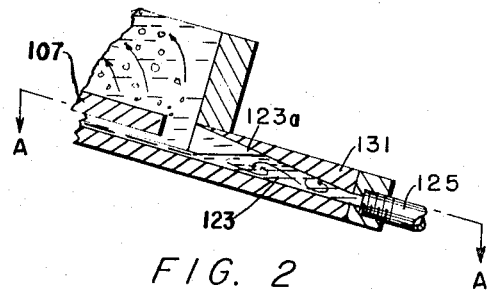
FIG. 2 is a side elevation in section of another form of the amalgam outlet means for the electrolytic cell of the present invention.

Referring agains to FIG. 1, an amalgam outlet means, indicated generally as 19, is disposed at the opposite end of the cathode base plate 1 from the mercury distributing means 10. In the amalgam outlet 19, the inclination of the cathode base plate, below the horizontal, is increased as shown at 3. For all cells of less than 15° inclination, the increased inclination at the discharge end is preferably of the order of 40°. For cells with greater inclination of the main portion of plate 1 the increased inclination at the discharge end should be less than 40° and as illustrated in FIG. 2 the end box or discharge end need not have any increased inclination, but provides an equivalent change in the directional angle of the amalgam flow. In FIG. 1 the part 3 is inclined about 55° below the horizontal, thus having an inclination of about 40° greater than the major portion of the cathode base plate 1. This increased inclined portion 3 of the cathode base plate changes the directional angle of the amalgam flow and produces an increase in the turbulence of the amalgam stream as it enters the amalgam pool in the amalgam outlet means 19.

A spacer 21 is secured in the end of the outlet means 19 by means of adjustable bolts 27 by which the position of the spacer may be adjusted. The spacer 21 extends the entire width of the cell and is spaced apart from the increased inclined portion 3 of the cathode base plate so as to form a narrowed throat 27a between the spacer 21 and the inclined portion 3, into which the amalgam entering the amalgam outlet 19 flows into a pool 23. The pool 23 widens out at 23a below the spacer 21 and has an exposed surface 23b where the amalgam pool remains in contact with the electrolyte, indicated at 31. As the amalgam flows down inclined portion 3 it tends to set up eddy currents, as indicated by the arrows, in both the narrow throat 27a and the pool 23a, below the spacer 21, which cause the amalgam in the throat 27a to churn and turn over and over without splashing, and also absorb some of the kinetic energy of the mercury stream flowing into the pool 23. The churning at the surface 23b of the amalgam pool 23 prevents stagnation of the amalgam surface and allows solid particles of graphite, for example, or electrodeposited magnesium, calcium or the like, which have a much lower specific gravity than the amalgam, to remain on the surface of the amalgam pool where they are dissolved in or entrained in the flowing electrolyte 31 and carried out of the cell. At the same time the amalgam in the narrow throat 27a and the churning motion prevents electrolyte from being trapped in the amalgam and flowing into the denuders where the sodium in the amalgam is coverted into sodium hydroxide. The amalgam removal conduit 25 is provided with a gooseneck as indicated at 25a or other suitable means for maintaining the head of amalgam in the outlet means 19 approximately at the level shown.

The automatic removal of solid particles and impurities, which deposit on the surface of the amalgam, from the cell is assisted and carried out by maintaining the electrolyte 31 in a high state of agitation and circulation. This high state of agitation and circulation is brought about by the particular construction and inclination of the cell in which the chlorine bubbles b released at the anodes 7 rise in a vertical direction to contact the cover plate 5 and then travel in a diagonal direction through the electrolyte to the gas space 32 at the upper left hand edge of the cell. An electrolyte inlet is indicated at 30a.

It can be located at any position in the electrolyte compartment of the cell.

As the gas bubbles released adjacent the lower end of the cell travel diagonally upwardly toward the chlorine and depleted electrolyte outlet 30, they encounter other gas bubbles released at the edges of anodes 7 further up the cell and all along the cell from the bottom to the top thereof gas bubbles rise vertically and travel diagonally along the underneath side of cover box 5 toward the upper edge of the cell giving a lift effect which provides violent agitation of the entire electrolyte. Observation of an electrolyte in the process of electrolysis, through sight glasses introduced into the side of an experimental cell shows that the electrolyte is maintained in a state of violent ebullition and is filled with small bubbles travelling vertically and diagonally therethrough similar to water boiling over a hot flame.

In addition to the violent agitation of the electrolyte produced by the gas bubbles $b$ the mercury film flowing downward over the cell base 1 provides a downward component of motion, part of which is transferred to the electrolyte, and there is a substantial depth of electrolyte indicated by the numeral 35 maintained at the upper end of cell 1, the electrolyte tends to be swept upwardly by the gas bubbles along the underside of cover box 5 and downwardly along the flowing mercury film 15a as indicated by the arrows in FIG. 1, to provided constant agitation of the electrolyte as well as circulation of the electrolyte through the gap between the anodes 7 and the flowing mercury film 15a.

This circulation is further promoted by the gas lifting effect of the bubbles $b$ which tend to reduce the effective density of the liquid above the anodes, causing the denser liquid which remains after the gas bubbles have escaped into the gas space 32 to flow back downward along the mercury surface on the top of cell base 1, the whole effect being to provide a violently agitated and circulating electrolyte.

The result of this agitation and circulation of the electrolyte 31 which sweep over the churning surface 23b of the amalgam pool 23 is to entrain solids in the electrolyte and carry them out of the cell with the depleted brine, where they can be settled or filtered out of the brine, and also to allow any calcium or magnesium or other metals which have been electrodeposited from the brine and float on the amalgam to come into contact with the circulating brine and be redissolved. As pointed out above, graphite has an apparent specific gravity of 1.6 to 2.2, calcium has a specific gravity of 1.55 and magnesium 1.74, the brine has a specific gravity of 1.2 and the amalgam has a specific gravity of 13.5. When advantage is taken of these differences in specific gravity and the cell is constructed and inclined substantially as indicated, a flowing mercury cathode cell inclined between 2° and 85°, preferably 5° to 30° to the horizontal, and provided with an amalgam discharge end box substantially as described, can be operated so that it is substantially self cleaning and expensive monitoring and manual flushing of impurities rendered unnecessary.

While the end box construction substantially as illustrated and described in connection with FIG. 1 is the preferred embodiment and method of practicing our invention, alternative constructions are illustrated in FIGS. 2 to 4, 9 and 10.

Figure 4:
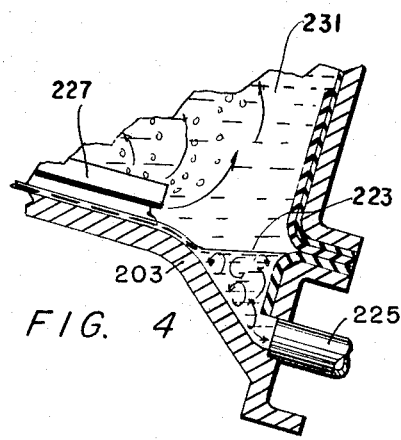
FIG. 4 is a side elevation in section of another form of the amalgam outlet means of the present invention.

The outlet means shown in FIG. 4 is similar to that in FIG. 1, with the exception that it does not have a spacer member. In this configuration as the amalgam stream enters the outlet means by passing down the increased inclined portion 203 of the cathode base plate it tends to set up eddy currents as indicated by the arrows and to cause churning of the surface 223. The energy of this flowing amalgam stream is partially dissipated by the pool formed in the outlet box and the exposed churning surface is in contact with the bubbling electrolyte 231 which is agitated by chlorine bubbles escaping around the edges of anodes 227. As in the configuration shown in FIG. 1, the pool is maintained in a non-quiescent or churning state by the flow of the amalgam stream down incline 203 to cause turbulence in the pool 223. The pool is maintained in the outlet means by a gooseneck discharge from the amalgam removal means 225, or by suitable valve means on the amalgam removal means so as to provide a holdup of the amalgam in the outlet means, sufficient to form the pool. Although the exposed surface of the pool formed by this configuration of the amalgam outlet means in somewhat greater than that formed by the configuration of FIG. 1, satisfactory operational results have been obtained with this configuration. However, as between the configuration of FIG. 1 and that of FIG. 4 the preferred amalgam outlet means is that shown in FIG. 1.

Figure 3:
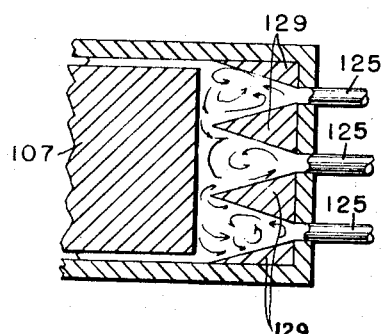
FIG. 3 is a plan view taken along the line "AA" of FIG. 2.

In the amalgam outlet means shown in FIGS. 2 and 3 there is no increase in the inclination of the cathode base plate within the outlet means. The turbulence of the amalgam stream is increased as it enters the outlet stream by passing through the constricted channels formed by the channel forming members 129 and 131. These channel-forming members effect a change in direction of the flow of at least a portion of the amalgam stream within the outlet means causing streams to flow as indicated by the arrows, thus increasing the turbulence of the exposed surface 123a of the amalgam pool 123. The surfaces of the members 129 and 131, which are in contact with the amalgam stream, converge generally toward the amalgam removal means 125, thus constricting the amalgam stream as it flows to the amalgam removal means. By thus constricting the amalgam stream, a pool is formed, the surface of which is shown in FIG. 2 as 123a. This pool is maintained in a non-quiescent or churning state by the flowing amalgam stream and serves to dissipate at least a portion of the energy of this stream and to maintain circulation in the pool from below the surface to the surface thereof. In these figures, the anode member of the cell is indicated as 107. Members 129 and 131 are suitably insulated or constucted of non-conducting material so as to insulate the cathodic portions from the anodic portions of the cell. A cathodic charge is maintained on the cell base and on the amalgam in pool 123 and an anodic charge is maintained on the cell cover and on the electrolyte. The outlet means of FIGS. 2 and 3 operates with great satisfaction in certain types of cells and is easy to construct and maintain in operation.

Figure 9:
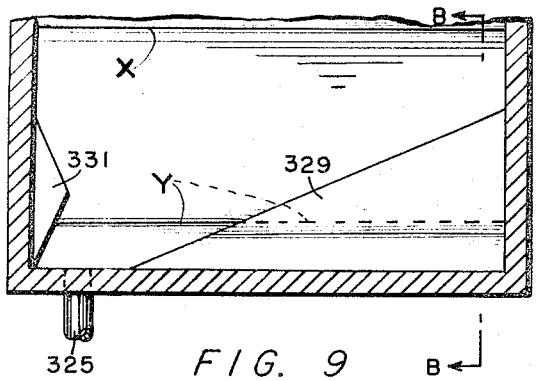
FIG. 9 is a plan view in section of another form of the amalgam outlet means.
Figure 10:
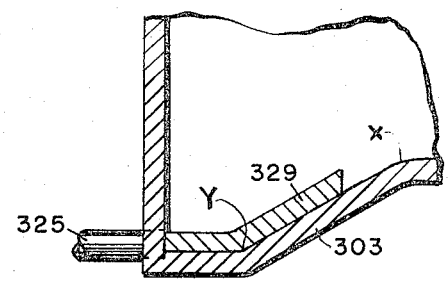
FIG. 10 is a side view taken along the line "BB" of FIG. 9.

The outlet means shown in FIGS. 9 and 10, is a variation which may be used in conjunction with the configurations shown in either FIG. 1 or FIG. 4. In this configuration channel-forming members 329 and 331 are provided to effect a further constriction in the width of the amalgam stream, thus further increasing the turbulence of the stream and providing a change in the directional angle of the stream toward the amalgam removal means 325. In this configuraton the increased inclined portion of the cathode base plate is indicated as 303. The lines X and Y in FIG. 9 and the corresponding letters in FIG. 10 indicate respectively the upper and lower bend in the cathode base plate forming the increased inclined portion 303. It is to be appreciated that this configuration of the amalgam outlet means, as well as those shown in FIGS. 1 through 4, is merely illustrative of means by which the turbulence of the amalgam stream may be increased within the outlet means and the formation of a non-quiescent or churning pool may be effected. Accordingly, these configurations are to be taken merely as being illustrative of the present invention, since it is believed that other variations will be apparent to those skilled in the art as many arrangements may be used which will absorb a substantial part of the kinetic energy of the mercury stream flowing down the inclined base plates and provide a turbulent or churning surface in contact with the electrolyte.

As is shown in FIG. 1, rubber insulating means 29 are provided between the cell cover 5 and the cathode base plate 1. This insulation is necessary to prevent current leakage between these surfaces inasmuch as the entire cell cover 5 is anodic and the cathode base plate is cathodic. Additionally, the entire inner surface of the cell cover and the sides of anode supports 9 and spacer 21 are covered with an insulating material 33 which will prevent the passage of current from these parts into the electrolyte, except through faces of the anode members 7. This insulation also serves to prevent any attack on the base metal of the cell cover by the electrolyte. The insulating covering 33 may be of rubber or of any other suitable material, such as the so-called "valve" metals, e.g., titanium, however if a valve metal like titanium is used, this valve metal can not be extended so far as to get in contact with the mercury or amalgam of the cathode.

Figure 8:
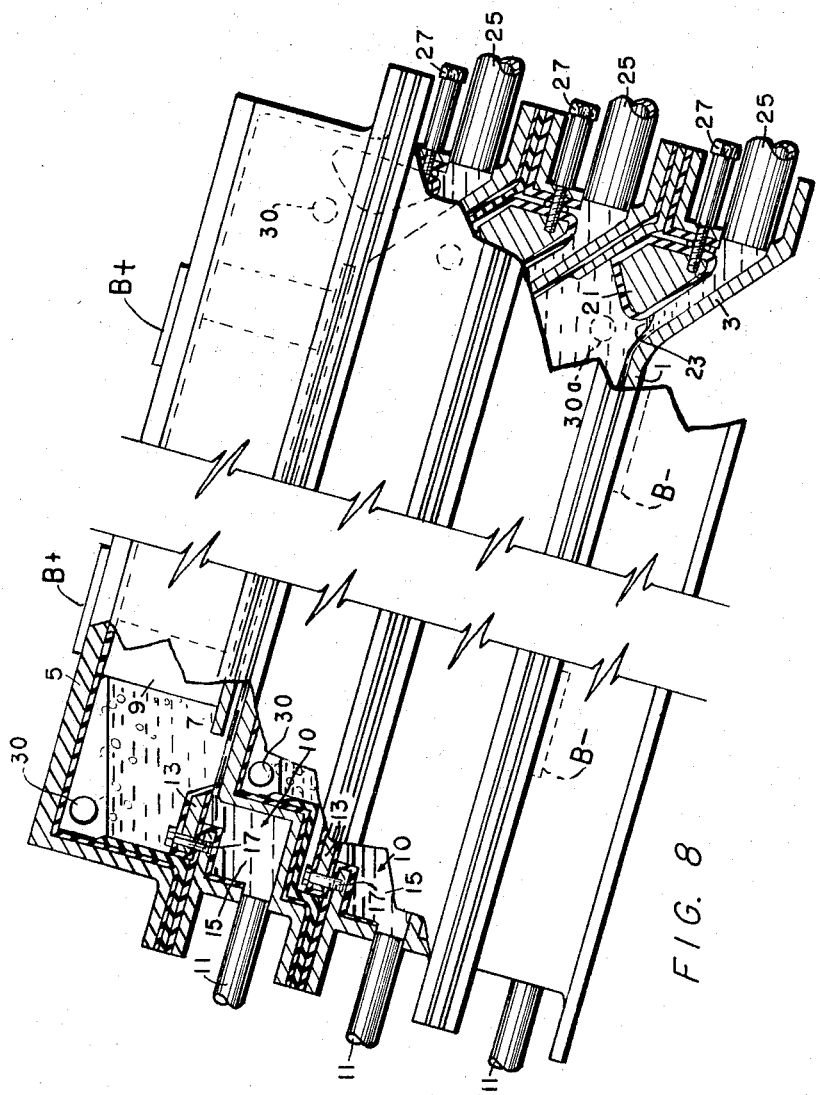
FIG. 8 is a side elevation partially in section of a series electrolytic cell made up of several of the single cells shown in FIG. 1.

FIG. 8 is a side elevation, partially in section, of a series cell embodying several individual cell units of the type shown in FIG. 1, stacked one on top of the other. In this embodiment of our invention, the cathode base plate 1 of the uppermost cell forms the top or cover for the next cell in the stack. The anode members for the second cell in the stack are secured to and supported from the bottom of the cathode base plate of the top cell in the stack. Similarly, the cathode base plate of the second cell in the stack forms the top or cover of the third cell in the stack, with the anode members for this third cell being supported by and secured to the bottom of the second cell's cathode base plate. This sequence is repeated for as many cell units as there are in the stack. Although in FIG. 8 only three cell units have been shown in a stack, it is to be understood that more than three cells may be so arranged. With this arrangement of the electrolytic cells of the present invention, positive bus bars B+ are attached to the cover 5 of the uppermost cell in the stack, and negative bus bar connections B— are made to the cathode base plate 1 of the lowermost cell in the stack, thus providing a series of bipolar cell units requiring positive and negative bus bar connections only at the top unit and bottom cell unit of the stack. As shown in FIG. 8, the various parts of the several cells, making up the series cell, are indicated by the same numerals as the corresponding parts of the single cell unit shown in FIG. 1. Accordingly, in view of the detailed description of the cell set forth, no further description of the various component parts of the series cell is believed to be necessary.

FIGS. 11, 12 and 13 show different forms of graphite anodes which may be used to reduce gas bubble retention on the active face of the anodes. In FIG. 11 the anode 7 has a plurality of holes 7a passing therethrough. In FIGS. 12 and 13 the faces of anodes 7 are provided with transverse grooves 7b or diagonal grooves 7c which facilitate the migration of the chlorine bubbles from the active face of the anodes into the grooves or holes and thence from the edges of the anodes into the electrolyte in the space above the anodes to provide the bubbling, circulating and gas lift effect previously described.

Figure 14:
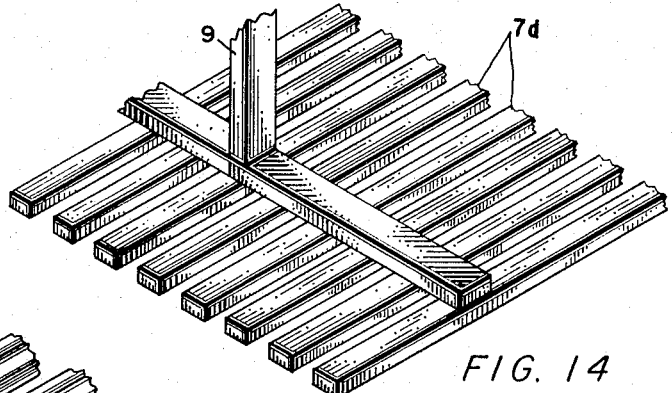
Figure 15:
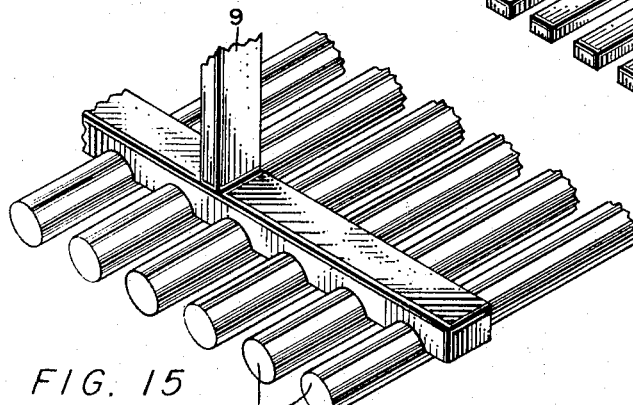

FIGS. 14 and 15 illustrate other forms of anodes which may be of metal or graphite in the shape of bars 7d or rods 7e supported from insulated anode supports 9.

Figure 16:
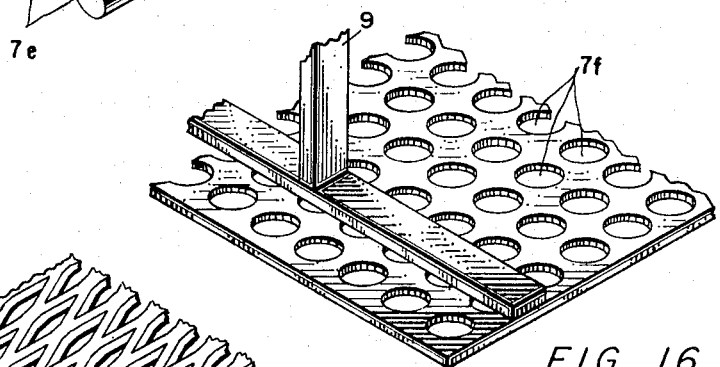
Figure 17:
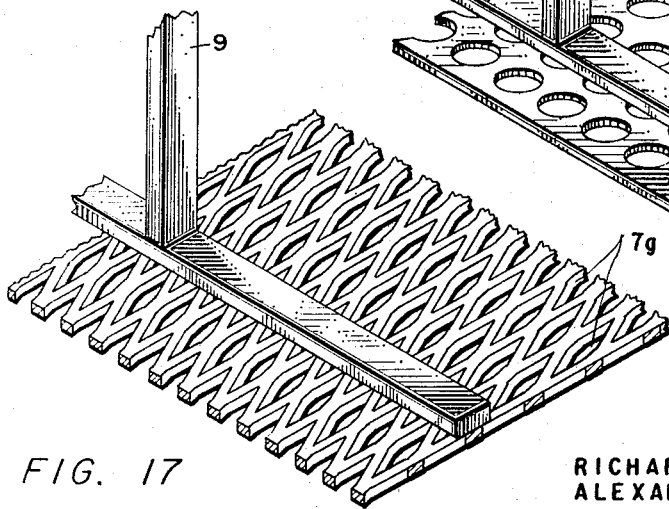

FIGS. 16 and 17 illustrate metallic anodes of platinum faced titanium as described, for example, in application Serial No. 44,301, filed July 21, 1960. In FIG. 16 the anode is provided with a plurality of holes 7f and in FIG. 17 a reticulated or expanded metal type of anode 7g is shown. Other forms of graphite or metallic anodes may of course be used.

EXAMPLES

In order that those skilled in the art may better understand the electrolytic cell of the present invention, the following specific examples are given showing the actual operation of this cell and the improved results which are obtained by its use.

Example I

To show the ability of the present cell to automatically tolerate and automatically remove brine impurities from the cell, a run was made wherein a purified sodium chloride brine was electrolized in a cell, as described hereinabove, and the amount of hydrogen in the gas produced in the cell was determined. Thereafter, a number of impurities were added to the brine, one at a time, and the cumulative effect of these impurities, in terms of hydrogen production, was determined. In this run the brine feed rate to the cell was such that a sodium chloride depletion of the brine of 40–50 grams per liter was obtained. The mercury feed rate to the cell was 4 liters per minute, per foot of cell width, and the sodium concentration of the amalgam produced in the cell was about 0.2%. The temperature of the brine within the cell was in the range of about 140° to 150°F. during the run and was uniform from end to end of the cell. The anode used was graphite having one-quarter inch slots spaced one-half inch apart, which slots were perpendicular to the mercury flow in the cell. The gap between the anode and the flowing mercury film cathode was about $3/16$ of an inch and the cathode current density was 5.0 amps. per square inch. For these runs the cell was inclined about 30° below the horizontal. The purified brine used for these initial runs had the following composition:

NaCl—310 g.p.l.
Mg—3.1 p.p.m.
Ca—Too small to measure
$SO_4$—Less than 3.0 g.p.l.
Ni—Too small to measure
Cu—Too small to measure
Fe—0.6 p.p.m.

The amount of hydrogen produced in this run, using this purified brine, was less than 0.5% of the volume of the cell gas produced. Thereafter, various quantities of impurities were added to the brine, one at a time, and after each addition the effect of each impurity on the hydrogen evolution in the cell was determined. In each case the amount of impurities added was sufficient to give the brine the indicated concentration of the impurity. Using this procedure, the following results were obtained:

| Impurity | Concentration in Brine | Effect |
| --- | --- | --- |
| Mg | 200 p.p.m. | No increase in $H_2$ evolution. |
| Ca | 200 p.p.m. | Do. |
| Fe | 10 p.p.m. | $H_2$ evolution increased to about 1%. |
| $SO_4$ | 15 g.p.l. | No further increase in $H_2$ evolution. |
| Ni | 10 p.p.m. | Do. |
| Cu | 5 p.p.m. | Do. |

From these results it is seen that the cell of the present invention has an extremely high tolerance to impurities in the sodium chloride brine feed. This high tolerance to the impurities makes it possible to operate this cell without the necessity of subjecting the brine to an extensive purification to remove impurities before it is introduced into the cell and without the necessity for careful monitoring and frequent manual purging of the cell.

Example II

A second run was made, using the procedure set forth in Example I. In this run the brine used had an impurity concentration of 200 p.p.m. Mg, 200 p.p.m. Ca, and 5 p.p.m. Fe. Using this brine, less than 0.5% hydrogen was present in the cell gas. Upon adding 6 p.p.m. titanium to the brine, there was a slight increase in the hydrogen evolution to slightly more than about 1% hydrogen. There was no build-up of Mg, Ca or Fe in the amalgam discharged from the cell.

Example III

An additional run was made, using the procedure as set forth in Example II, with the exception that 4 p.p.m.

vanadium was added to the brine, instead of the titanium. In this run there was a similar slight increase in the hydrogen evolution to just slightly more than 1% hydrogen in the cell gas.

Example IV

A continuous run was made for a period of five days. In this run the rate of feed for the sodium chloride brine was 0.6 liter per minute, and the temperature of the brine inside the cell was 160° F. The mercury feed rate to the cell was 4 liters per minute per foot of cell width, and the sodium concentration of the amalgam produced was about 0.2%. The anode used was of graphite, having one-quarter inch slots spaced one-quarter of an inch apart, which slots were perpendicular to the mercury flow. The gap between the graphite anode and the flowing mercury film cathode was $3/16$ of an inch. The cathode current density was 5.0 amps. per square inch, and the cell was inclined 30° below the horizontal during the run. The brine used during this run had the following composition:

NaCl—300 g.p.l.
Mg—95 p.p.m.
Ca—1500 p.p.m.
$SO_4$—3.5 g.p.l.
Fe—0.25 p.p.m.

Using this procedure, with the electrolytic cell of the present invention, the average analysis of the content of the cell gas produced was as follows:

$Cl_2$—99.1%
$CO_2$—0.25%
$O_2$—0
$H_2$—0.28% with air air making up the remainder to 100%. This analysis was based on the average of a total of 45 samples taken during the course of the 7-day run. The current efficiency of the cell during this run was 99.5%, and the caustic soda produced was of rayon grade.

This run shows that the electrolytic cell of the present invention not only has a high tolerance for impurities in the brine, but that this tolerance is maintained during a prolonged period of electrolysis while still maintaining a high current efficiency for the cell.

Example V

To show the increased cathode current density obtainable with the electrolytic cell of the present invention, without a corresponding increase in the cell voltage, a run was made using a purified brine as described in Example I. In this run the brine temperature was about 155° F. and the brine depletion rate was about 40 g.p.l. The mercury flow rate was about 4 liters per minute. The electrode gap between the anode and cathode surfaces was $1/32$ of an inch, the anode used being of graphite having one-quarter inch slots spaced one-quarter of an inch apart. These slots were diagonal to the mercury flow, at about a 45° angle. During this run the cell was inclined below the horizontal about 60°. Using this procedure the following results were obtained:

| Cathode current density in amp./in.$^2$ | Cell voltages, recorded from anode to Hg surface |
|---|---|
| 1.0 | 3.25 |
| 2.0 | 3.42 |
| 3.0 | 3.59 |
| 4.0 | 3.77 |
| 5.0 | 3.94 |
| 6.0 | 4.12 |
| 7.0 | 4.32 |
| 8.0 | 4.58 |

From these results it is seen that it is possible to operate the electrolytic cell of the present invention at current densities as high as 7 or 8 amps. per square inch, while still maintaining the cell voltage at less than about 4.6 volts.

Example VI—Part A

To show the ability of the electrolytic cell of the present invention to tolerate a build-up of sodium in the amalgam a run was made, wherein the amalgam produced in the cell was not denuded but was recycled back into the cell. In this run the cell used was one foot in length and one foot in width and had the amalgam outlet configuration shown in FIGS. 2 and 3 of the drawings. The cell was operated, inclined at an angle of 30° below the horizontal. The mercury and amalgam were appied to the cell at a rate of 7.5 liters per minute. The sodium chloride brine used was the purified brine described in Example I, and the temperature was 150° to 155° F. The anodes used were slotted, having one-quarter inch slots spaced one-quarter inch apart, the slots being perpendicular to the mercury flow. The gap between the anode surface and the surface of the mercury was $3/16$ of an inch. The cathode current density was 5 amps./in.$^2$. Samples were taken periodically of both the amalgam and the cell gas produced. Using this procedure the following results were obtained:

| Time After Start of Run (Hours) | Amalgam Concentration (Percent Na) | Percent $H_2$ in Cell Gas |
|---|---|---|
| 3.0 | .221 | 0.29 |
| 4.0 | .305 | 0.39 |
| 6.5 | .540 | 0.82 |

The current efficiency of this cell was better than 98% throughout the run.

Part B

The run set forth in Part A was continued until the percent of sodium in the amalgam was .7%. At this time the percent of hydrogen in the cell gas was still less than 1% and the current efficiency of the cell was still above 98%. From these results it is seen that the electrolytic cell of the present invention can be operated to produce amalgams containing high percentages of sodium without any adverse effect upon the cell operation, either in terms of the hydrogen produced or in the current efficiency of the cell. In this run it was found that the practical maximum limit for the concentration of the amalgam produced was slightly less than 0.9% sodium in the amalgam. The reason for this was that, at a sodium concentration of about 0.9%, the amalgam freezes or solidifies upon cooling to room temperature, thus making it impossible to work with.

Example VII

When using the electrolytic cell set forth in Example VI with a mercury feed rate of 2 liters per minute and a cathode current density of 7 amps. per square inch, in one pass of the mercury through this cell the sodium concentration of the amalgam is 0.05%. In six passes through this cell the sodium concentration in the amalgam is increased to 0.3%. After eighteen passes through the cell the sodium concentration in the amalgam is increased to 0.9%. From this it will be seen that, by using an electrolytic cell of the present invention, 18 feet long, an amalgam would be produced which has a sodium concentration of 0.9%. An amalgam, having a sodium concentration of about 0.7%, would be formed in a similar cell, which is only 14 feet long.

Example VIII

A run was made using an electrolytic cell, similar to that used in Example VI, with the exception that the cell was one foot wide and six feet long. This cell was operated for a period of about four days, during which time the NaCl brine, passed through the cell, was resaturated about 113 times with impure "as mined" rock salt with no dechlorination, pH adjustment, or purge. The run was started with the cell inclined below the horizontal about 5°. This inclination was increased to about 15° during the course of the run. The brine used had an are commercial horizontal mercury cells, while cell F is a commercial vertical mercury cell.

| Characteristics | Cell A | Cell B | Cell C | Cell D | Cell E | Cell F | Present Cell [1] |
|---|---|---|---|---|---|---|---|
| Rated Cathode Current Density, Amps per In.[2] | 3.1 | 3.6 | 2.6 | 2.2 | 2.4 | 1.2 | 8.0 |
| Cell Voltage at Rated Current Density, Volts | 4.50 | 4.41 | 4.32 | 4.25 | 4.40 | 4.3 | 4.58 |
| Current Efficiency, Percent | 95 | 96+ | 95–97 | 94–95 | 94–96 | 95–97 | 97.5 |
| Cell Width, Feet | 2.9 | 5.2 | 5.4 | 6.3 | 8.1 | 3.9 | 6.0 |
| Cell Length, Feet | 40.0 | 84.8 | 57.8 | 64.6 | 52.5 | 3.6 | 6.0 |
| Floor Space per Daily Ton of $Cl_2$, ft.[2] | 265.8 | 95.3 | 249.6 | 228.1 | 184.0 | 116.2 | [2] 50 |
| Na Content of Amalgam Entering Decomposer, Percent | 0.15 | 0.70 | 0.20–0.25 | 0.15 | 0.12–0.15 | 0.05–0.10 | [3] 0.30 |
| Hg Weight for 100 Tons/Day Plant ($Cl_2$), lbs | 322,000 | 139,000 | 224,000 | 232,000 | 208,000 | 180,000 | 100,000 |

[1] Inclination 5° to 30°.
[2] This is on the basis of a six-tier cell and includes all the appurtenances required, such as denuder, breaker, pumptanks, and the like. For a one-tier cell, about 120 ft.[2] could be required.
[3] This is for a six-foot cell. As shown hereinabove, it would be 0.70 for a 14-foot cell.

NaCl content of about 300 grams/liter. The impurities in the brine, initially, were as follows:

$Ca^{++}$—1.25 grams/liter
$Mg^{++}$—0.03 grams/liter
$SO_4$—2.4 grams/liter
Fe—0.001 grams/liter
Insolubles—2.75 grams/liter The brine was resaturated during the run with solid NaCl having the above impurities, on the basis of a 300 gram/liter brine. The cell was operated under the following conditions:

Cathode current density—5.0 amps./in.$^2$
Cell temperature—160°±5° F.
Brine depletion—60 grams/liter
Hg Flow—3000$_m$l./min.
Na content in amalgam—0.15%

Under these conditions the analysis of the feed brine after various numbers of resaturations was as follows:

| No. of Resaturations | pH | Grams/liter | | | |
|---|---|---|---|---|---|
| | | NaCl | $Mg^{++}$ | $Ca^{++}$ | Fe |
| 0 | | 293 | 0.030 | 1.25 | |
| 3.5 | 4.5 | 305 | 0.111 | 0.97 | 0.005 |
| 19 | 3.8 | 279 | 0.169 | 0.97 | |
| 24 | 3.8 | 313 | 0.218 | 1.25 | 0.005 |
| 41 | 3.9 | 297 | | 1.33 | |
| 70 | 4.2 | 266 | 0.274 | 1.45 | |
| 100 | 4.1 | 293 | 0.370 | 1.47 | 0.004 |
| 113 | 5.0 | 298 | 0.543 | 1.79 | |

NOTE.—$SO_4$=content remained substantially unchanged, i.e., about 2.6 grams/liter.

The hydrogen content of the cell gas, after 100–112 resaturations, was about 0.7%. Additionally, the current efficiency of the cell during this run averaged 97.5%.

These results show that, during the course of this run, the major impurities in the brine, with the exception of $Mg^{++}$, reached the saturation point. Notwithstanding this fact, the cell continued to operate with low hydrogen evolution and high current efficiency. This shows that the present cell can be efficiently operated, even using a brine which is saturated with $Ca^{++}$, $SO_4^=$ and Fe impurities.

In order to compare the electrolytic cell of the present invention with various flowing mercury film cathode electrolytic cells, presently in commercial use, attention is directed to an article appearing in the September 1957 edition of Chemical Engineering Progress (vol. 53, No. 9) page 409, entitled "Chlorine Caustic Cell Development in Europe and the United States." On page 416 of this article, a table is set forth giving the characteristics of various mercury cells, now in commercial operation. For the sake of convenience, a portion of the data in this table is set forth hereinbelow and compared with similar data obtained for the cell of the present invention. It is to be noted that, as set forth in this table, cells A to E As shown by the above the electrolytic cell of the present invention is greatly superior to the electrolytic mercury cells presently in commercial use. The present cell operates at a higher cathode current density without a corresponding increase in voltage and still maintains a current efficiency at least as high as that of any of the present commercial cells. Additionally, the floor space required to produce a ton of chlorine per day in the present cell is considerably less than that in any of these commercial cells, while the mercury required for a 100-ton per day plant is at least about one-third less than that required for any of the other cells. This, in itself, represents a savings of several hundred thousand dollars, in terms of the mercury inventory required for a plant of 100 tons Cl per day. With regard to the sodium content of the amalgam produced by the present cell, it is noted that, with one exception, e.g., Cell B, the sodium content of the amalgam from the present cell is higher than all of the other commercial cells. In this regard it is to be noted, as pointed out in the above table, that an amalgam having a sodium content of 0.30% is produced in the present cell, having a length of only 6 feet. However, amalgam, having a sodium concentration comparable to that of Cell B, would be produced in the present cell if its length were extended to only 14 feet. This is in contrast to Cell B, wherein a length of 84.8 feet is required to produce this same amalgam having a sodium concentration of 0.70%. In addition, the cell is substantially self cleaning as to impurities which normally accumulate in a flowing mercury cathode cell so that careful monitoring and manual flushing of impurities is not necessary. From these results and for these reasons it is readily seen that the cell of the present invention is a great improvement over those mercury electrolytic cells which are presently in use.

Although the invention has been described with reference to an inclined plane mercury cell, the principles of the end box constructions herein described can also be used to advantage with horizontal mercury cells with inclinations of less than 1° and it is to be understood that, although the invention has been described with specific reference to particular embodiments thereof, it is not to be so limited since changes and alternations may be made which are within the full intended scope of this invention, as defined by the appended claims.

We claim:

1. The method of operating an inclined plane mercury cell having an essentially box type cell structure with anodes, a cathode base plate and the cell cover substantially parallel, a mercury inlet, an electrolyte inlet, a depleted electrolyte and gas discharge outlet at the upper edge of the cell, a mercury amalgam discharge end and means to pass an electrolysis current through said cell which comprises maintaining said cell at an inclination of about 2° to about 85° from the horizontal, filling said cell with electrolyte substantially to the upper edge thereof, flowing mercury down said cathode base plate between the base plate and the anodes, passing an electrolysis current through said cell to decompose the electrolyte and from amalgam with said mercury, changing the directional angle of amalgam flow at the mercury amalgam discharge end of said cell to form a churning pool of amalgam at the discharge end of said cell, with the upper surface of said pool in contact with the electrolyte, absorbing the kinetic energy of said flowing amalgam stream in said amalgam pool and causing the churining motion at the surface of the pool to keep solid impurities on the top of the amalgam pool, circulating the electrolyte by the gas bubbles generated by the electrolysis of said electrolyte moving vertically and diagonally upward through said electrolyte above the anodes and along the bottom side of said cell cover to the upper edge of the cell and by the downward flow of mercury on said cathode base plate to circulate said electrolyte over the churning surface of said amalgam pool to remove solid impurities from the top of the amalgam pool and carry them out of the cell, while maintaining the electrolysis current on said electrolyte and said amalgam and the electrical continuity of said amalgam.

2. The method of claim 1, in which the inclination of the cell is between about 5° and about 30° from the horizontal.

3. The method of claim 1 in which a plurality of churning amalgam pools is formed at the discharge end of said cell.

4. The method of claim 1 in which a plurality of churning amalgam pools is formed by changing the directional angle of amalgam flow between converging surfaces on a substantially straight cathode base plate.

5. The method of claim 1 in which a series of inclined plane mercury cells are stacked one on top of the other, the cathode base plate of an upper cell is used as the top of a lower cell and the anodes of the lower cells are supported from and electrically connected to the cathode base plate of an upper cell and said series of cells are operated as bipolar cells by connecting a positive electrical connection to the cover of the uppermost stacked cell and a negative electrical connection to the cathode base plate of the lowermost stacked cell.

References Cited by the Examiner
UNITED STATES PATENTS

| | | | |
|---|---|---|---|
| 598,193 | 2/1898 | Andreoli | 204—267 |
| 2,576,553 | 11/1951 | Andreasen | 204—219 |
| 2,648,630 | 8/1953 | Basilewsky | 204—219 |
| 2,688,594 | 9/1954 | Oosterman | 204—219 |
| 2,836,551 | 5/1958 | Heller et al. | 204—220 |
| 2,848,406 | 8/1958 | Szechtman | 204—219 |
| 2,848,408 | 8/1958 | Neipert et al. | 204—219 |
| 2,898,284 | 8/1959 | Neipert et al. | 204—219 |

FOREIGN PATENTS

| | | |
|---|---|---|
| 470,726 | 1/1951 | Canada. |
| 852,597 | 10/1960 | Great Britain. |

OTHER REFERENCES

"Chemical Engineering," McGraw-Hill publication, New York, July 1952, pages 265-266.

JOHN H. MACK, *Primary Examiner.*

MURRAY TILLMAN, *Examiner.*

L. G. WISE, H. M. FLOURNOY, *Assistant Examiners.*

UNITED STATES PATENT OFFICE
CERTIFICATE OF CORRECTION

Patent No. 3,308,043                                            March 7, 1967

Richard Eric Loftfield et al.

It is hereby certified that error appears in the above numbered patent requiring correction and that the said Letters Patent should read as corrected below.

Column 6, line 10, for "agains" read -- again --; column 15, line 2, for "from" read -- form --.

Signed and sealed this 21st day of November 1967.

(SEAL)
Attest:

Edward M. Fletcher, Jr.                                          EDWARD J. BRENNER Attesting Officer                                                 Commissioner of Patents